Dec. 24, 1935.   C. J. HOLSLAG   2,025,206
WELDING ELECTRODE
Filed June 2, 1934   2 Sheets-Sheet 1
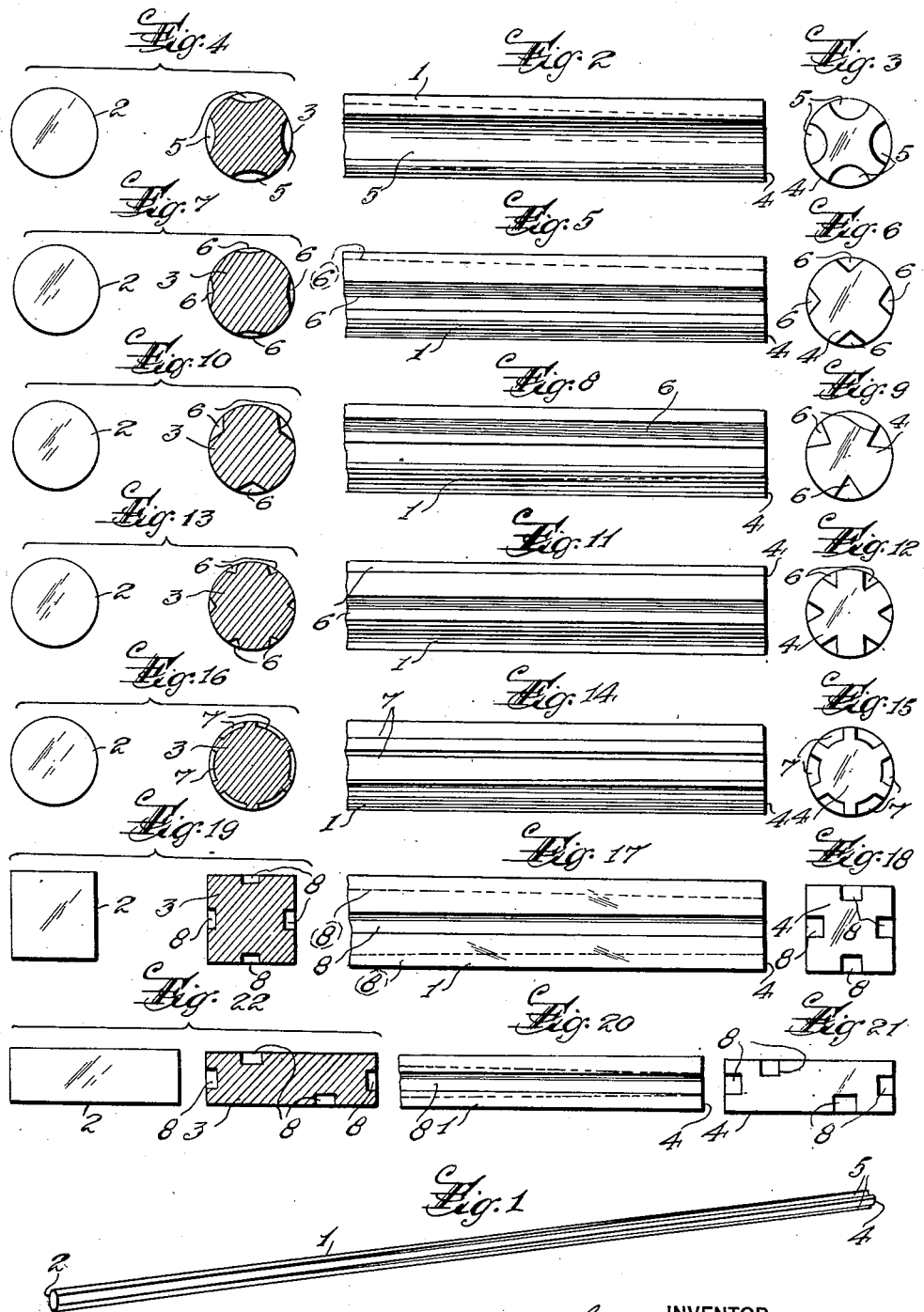
INVENTOR
Claude J. Holslag
BY
A. D. T. Libby
ATTORNEY

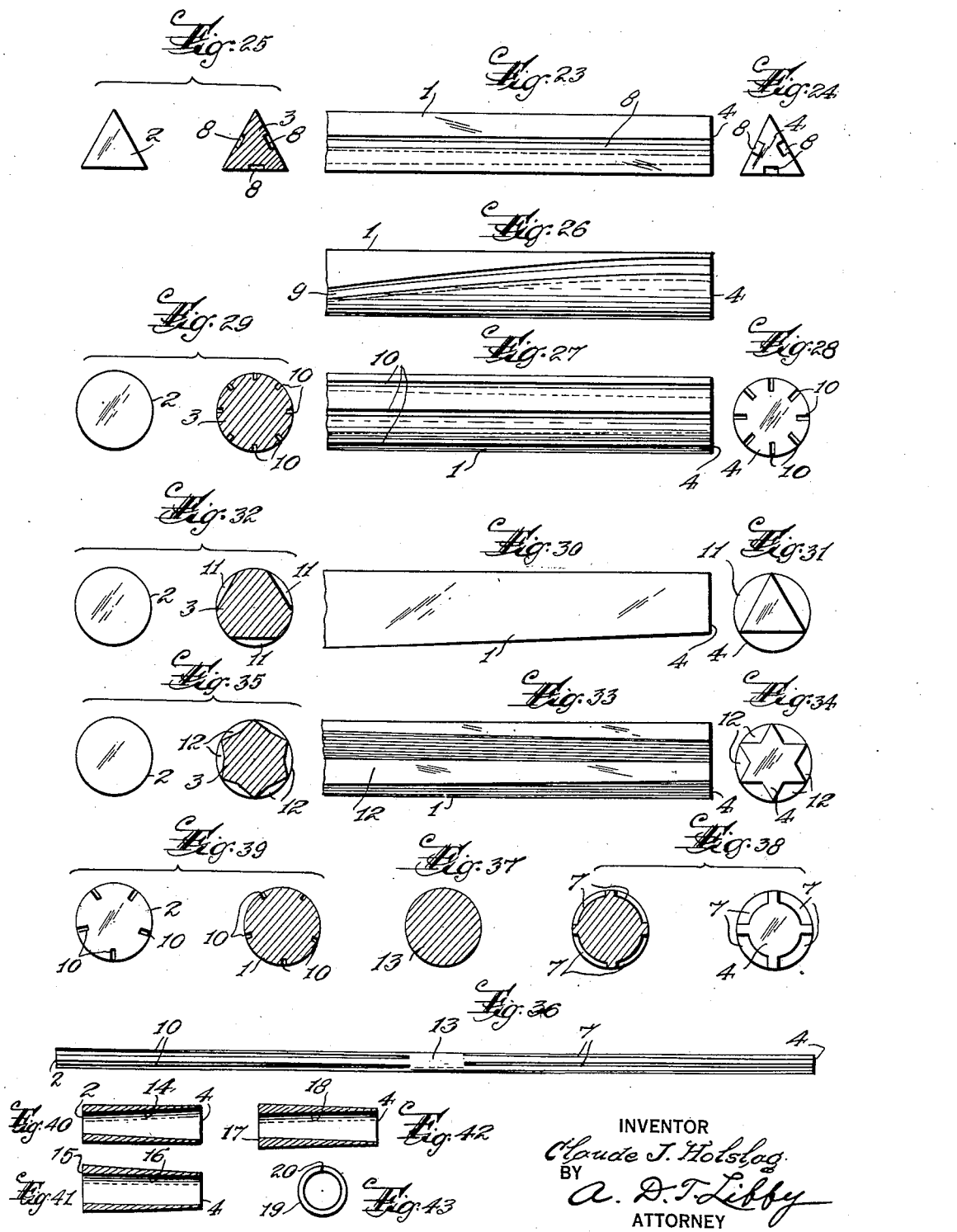

Patented Dec. 24, 1935

2,025,206

UNITED STATES PATENT OFFICE 2,025,206

WELDING ELECTRODE

Claude J. Holslag, South Orange, N. J., assignor to Electric Arc Cutting & Welding Company, Newark, N. J.

Application June 2, 1934, Serial No. 728,647

16 Claims. (Cl. 219—8)

This invention relates to an electrode used for welding purposes, and while it may be used in gas-flame welding, it is especially advantageous for use in electric arc welding, cutting or the like.

The Flood et al. Patent 1,496,930 points out clearly and in considerable detail the advantages and desirability of having a less amount of metal at the arc starting end of the electrode than at the handle end, and since reference may be had to the Flood et al. patent, it is not deemed necessary herein to repeat these advantages, but simply to mention that my present application is directed to certain improvements and/or modifications of the Flood et al. electrode The drawings attached hereto disclose various ways in which the advantages of the Flood et al. electrode may be secured. In the drawings:

Figure 1 is a perspective view of an electrode suitable for welding purposes.

Figure 2 is an enlarged view of a section of an electrode which may be that shown in Figure 1.

Figure 3 is a view of the right-hand end of Figure 2 and may be referred to as the arc starting end of the electrode.

Figure 4 illustrates a left-hand end view and a mid-sectional view between the two ends of the electrode of Figure 2.

Figure 5 is a view similar to Figure 2, but of a modified form of electrode.

Figure 6 is a view of the right-hand end of Figure 5.

Figure 7 is a view of the left-hand end and a central sectional view through the electrode of Figure 5.

Figure 8 is a further modified form of electrode.

Figure 9 is a view of the right-hand end of Figure 8.

Figure 10 is a view of the left-hand end and a central sectional view through the electrode of Figure 8.

Figure 11 is a further modified form of electrode.

Figure 12 is a view of the right-hand end of Figure 11.

Figure 13 is a left-hand end view and a central sectional view through the electrode of Figure 11.

Figure 14 is a further modified form of electrode.

Figure 15 is a view of the right-hand end of Figure 14.

Figure 16 is a left-hand end view and a central sectional view through the electrode of Figure 14.

Figure 17 is a further modified form of electrode.

Figure 18 is a right-hand end view of Figure 17.

Figure 19 is a left-hand end view and a central sectional view through the electrode of Figure 17.

Figure 20 is a further modified form of electrode.

Figure 21 is a view of the right-hand end of Figure 20.

Figure 22 is a left-hand end view and central sectional view through the electrode of Figure 20.

Figure 23 is a further modified form of electrode.

Figure 24 is a right-hand end view of Figure 23.

Figure 25 is a left-hand end view and central sectional view through the electrode of Figure 23.

Figure 26 shows a further modified form of electrode in which the grooves or projections thereon may be spirally arranged.

Figure 27 is a further modified form of electrode.

Figure 28 is a right-hand end view of Figure 27.

Figure 29 is a view of the left-hand end and a central sectional view of the electrode of Figure 27.

Figure 30 is a further modified form of electrode.

Figure 31 is a right-hand end view of Figure 30.

Figure 32 is a left-hand end view and central sectional view through the electrode of Figure 30.

Figure 33 is a view of a still further modified form of electrode.

Figure 34 is a right-hand end view of the form shown in Figure 33.

Figure 35 is a left-hand end view and central sectional view through the electrode of Figure 33.

Figure 36 is a view of a further modified form of electrode which is adapted to be engaged by the holder at the central part of the electrode.

Figure 37 is a cross-sectional view through the central portion of the electrode of Figure 36.

Figure 38 is a right-hand end view and cross-sectional view between the central or handle part of the electrode and the right-hand end of the electrode of Figure 36.

Figure 39 is a left-hand end view and sectional view half-way between the left-hand end and the central or handle portion of the electrode of Figure 36.

Figure 40 is a longitudinal section through a further modified form of electrode on a compressed or much shortened scale.

Figure 41 is a modification of the electrode shown in Figure 40.

Figure 42 is a view of another form of electrode using certain features of Figures 40 and 41.

Figure 43 is an end view of a blank which may be used in forming the electrodes of Figures 40 to 42.

In Figures 1 to 35 inclusive, the electrode 1 is of substantially uniform diameter throughout its length as indicated by the circles 2, 3 and 4, the circle 2 illustrating the boundary of the extreme left-hand or handle end of the electrode 1. The electrode 1 is provided with a plurality of flutes, notches or grooves 5 which increase in area from the handle end 2 to the arc starting end 4, and it will be noted that the grooves 5 within the periphery of the circle 3, taken substantially at a point midway between the ends of the electrode, are of much less area than at the arc starting end. This means that the amount of metal at the arc starting end is much less than at any other section between the arc starting end and the handle end. The same applies to the various other figures.

The electrode of Figures 5 to 7 inclusive is provided with four grooves or notches different in shape than the grooves 5 shown in Figures 3 and 4.

In Figures 9 and 10 inclusive the notches 6 are similar to those shown in Figure 6, but are only three in number.

In Figure 12 the electrode is provided with notches or grooves 6 similar to those shown in Figure 9, but twice as many being indicated.

In Figures 14 to 16 inclusive, the electrode is provided with a differently shaped groove 7.

In Figures 17 to 19 inclusive, the electrode is square, having a square, tapering groove 8 on each face.

In Figures 20 to 22, the electrode is rectangular in shape having grooves 8 similar to those shown in Figure 18.

In Figures 23 to 25, the electrode is shown triangular in shape and has grooves 8 similar to those shown in Figures 18 and 21.

In Figure 26, the grooves or notches 9 may be of any desired shape and are arranged as a spiral helix from end to end of the electrode.

In Figures 27 to 29 inclusive, the grooves 10 may be narrower and deeper than those of Figure 8.

In Figures 30 to 32 inclusive, the electrode may have a plurality of tapering flats 11, three being indicated.

In Figures 33 to 35 inclusive, the grooves or notches 12 may be arranged in a still different manner.

In Figure 36, the electrode is provided with a solid central sectional portion 13 for receiving the handle, and the welding operations may be carried out from either end toward the center, and the opposite end portions may be the same or a different arrangement of flutes, grooves or notches, the ones on the left of the central portion 13 being similar to 10 of Figure 28, while those on the right may be similar to 7 of Figure 15. In drawing or rolling the electrodes, the metal may be forced up into ridges, but this gives a similar effect as forming the electrode with flutes, grooves or notches.

Figure 40 is a sectional view through an electrode having a cylindrical exterior, the ends of the electrode being indicated by the numerals 2 and 4 as in Figures 3 and 4, but which has a tapered internal bore 14, thereby giving a less amount of metal at the arc starting end 4, and a greater amount of metal at the handle end 2.

In Figure 41, the handle end 15 of the electrode is larger than the arc starting end 4, while the bore 16 is of uniform diameter.

In Figure 42, the handle end 17 is larger than the arc starting end 4 with a greater amount of metal at the handle end, while the bore 18 is larger at the arc starting end, so that if the interior of the electrode is filled with flux or cutting material, it will give the desired effect as in the other types of electrodes. This applies also to Figure 40 as regards the flux.

In Figure 43, the electrode is shown as made up of strip metal which may be rolled to the desired thickness to conform to the sections shown in Figures 40 to 42 inclusive, this sheet 19 being rolled preferably cylindrical so that the edges substantially meet on the line 20.

While these various types of electrodes will give the results and advantages set forth in the Flood et al. patent, the grooves, flutes or notches or equivalents thereof may be further advantageously utilized for carrying any desired welding flux or cutting compound; for example, the fluxing or cutting materials set forth in several of my patents, for instance those disclosed in Patent 1,528,878, issued March 10, 1925. However, I do not wish to be limited to any particular kind of fluxing or cutting materials as these may be varied to suit conditions. When the flux is added to the electrodes in the forms shown in Figures 1 to 39 inclusive, it may fill the grooves to the peripheral boundary as represented by the circles 2, 3 and 4; when used in the forms shown in Figures 40, 41 and 42, the flux material preferably fills the interior of the rod.

What I claim is:

1. A welding electrode consisting of a metal rod having groove-like formations therein of larger area at one end of the rod than at other longitudinal portions of the rod.

2. A welding electrode consisting of a metal rod of substantially uniform diameter throughout its length but having groove-like formations therein tapering away from one end of the rod.

3. A welding electrode consisting of a metal rod having tapered groove-like formations therein from one end of the rod to the other.

4. A welding electrode consisting of current-conducting material having groove-like formations therein of larger area at one end of the electrode than at other longitudinal portions of the electrode.

5. A welding electrode consisting of current-conducting material of substantially uniform diameter throughout its length but having groove-like formations therein tapering away from one end of the rod.

6. A welding electrode consisting of current-conducting material having tapered groove-like formations therein from one end of the electrode to the other.

7. In an electric arc welding system including an electrode, means for presenting at the arc starting end of the electrode an amount of material less than at other portions of the electrode, said means comprising groove-like formations in the surface of the electrode material, said grooves diminishing in area away from the arc starting end of the electrode.

8. A welding electrode as set forth in claim 7, further characterized in that the groove-like formations are spirally arranged longitudinally of the length of the electrode.

9. A welding electrode as set forth in claim 7, further characterized in that the groove-like formations are substantially filled with one or more materials which will assist the arc operations.

10. A welding electrode as set forth in claim 7, further characterized in that the groove-like formations are spirally arranged longitudinally of the length of the electrode, and then at least one of the grooves is substantially filled with one or more materials which will aid the arc operations.

11. A welding electrode consisting of a metal rod having groove-like formations therein of larger area at one end of the rod than at other longitudinal portions of the rod, at least one of said groove-like formations being substantially filled with one or more materials which will assist the arc operations.

12. In an electric arc welding system including an electrode, means for presenting at the arc starting end of the electrode and continuously toward the handle end of the electrode as the electrode is consumed an amount of material less than at other portions of the electrode more distant from the arc, said means comprising a formation of the electrode material such that at least one space is formed between portions of the material longitudinally of its length, said material being greater in amount at one end of the electrode than at the other.

13. A welding and/or cutting electrode as set forth in claim 12, further characterized in that said space is wholly within the electrode material.

14. A welding and/or cutting electrode as set forth in claim 12, further characterized in that said space is of greater cross-sectional area at that end of the electrode having the least amount of material therein.

15. A welding and/or cutting electrode as set forth in claim 12, further characterized in that said space is wholly within the electrode material, and further characterized in that the material of the electrode tapers in amount from one end to the other.

16. A welding and/or cutting electrode as set forth in claim 12, further characterized in that said space is of greater cross-sectional area at that end of the electrode having the least amount of material therein, said space being filled with one or more materials which will assist the arc operations.

CLAUDE J. HOLSLAG.